United States Patent [19]

Langieri

[11] 4,095,816
[45] Jun. 20, 1978

[54] TOY VEHICLE CONSTRUCTION

[76] Inventor: Michael Langieri, 8 Cedar St., Butler, N.J. 07450

[21] Appl. No.: 752,360

[22] Filed: Dec. 20, 1976

[51] Int. Cl.² .............................................. B62B 7/04
[52] U.S. Cl. .......................................... 280/87.02 R
[58] Field of Search ..................... 280/87.01, 87.02 R, 280/1.11 R, 1.208, 1.1 R, 202, 289; 272/52, 52.5, 53.1, 53.2; D34/15 AE

[56] References Cited

U.S. PATENT DOCUMENTS

| 846,695 | 3/1907 | Reed | 280/202 |
|---|---|---|---|
| 2,191,184 | 2/1940 | Voorheis | 280/87.01 X |
| 2,625,982 | 1/1953 | Bulmash | 280/1.11 R X |
| 3,333,862 | 8/1967 | Rockwell | 280/87.02 R |

Primary Examiner—Joseph F. Peters, Jr.
Assistant Examiner—R. Schrecengost
Attorney, Agent, or Firm—Blum, Moscovitz, Friedman & Kaplan

[57] ABSTRACT

A toy vehicle is provided having a playing surface also used to steer the front wheel assembly. The vehicle has a straddle seat and is foot propelled. A storage box at the rear of the vehicle also forms a seat back.

12 Claims, 6 Drawing Figures

FIG. 2
FIG. 3
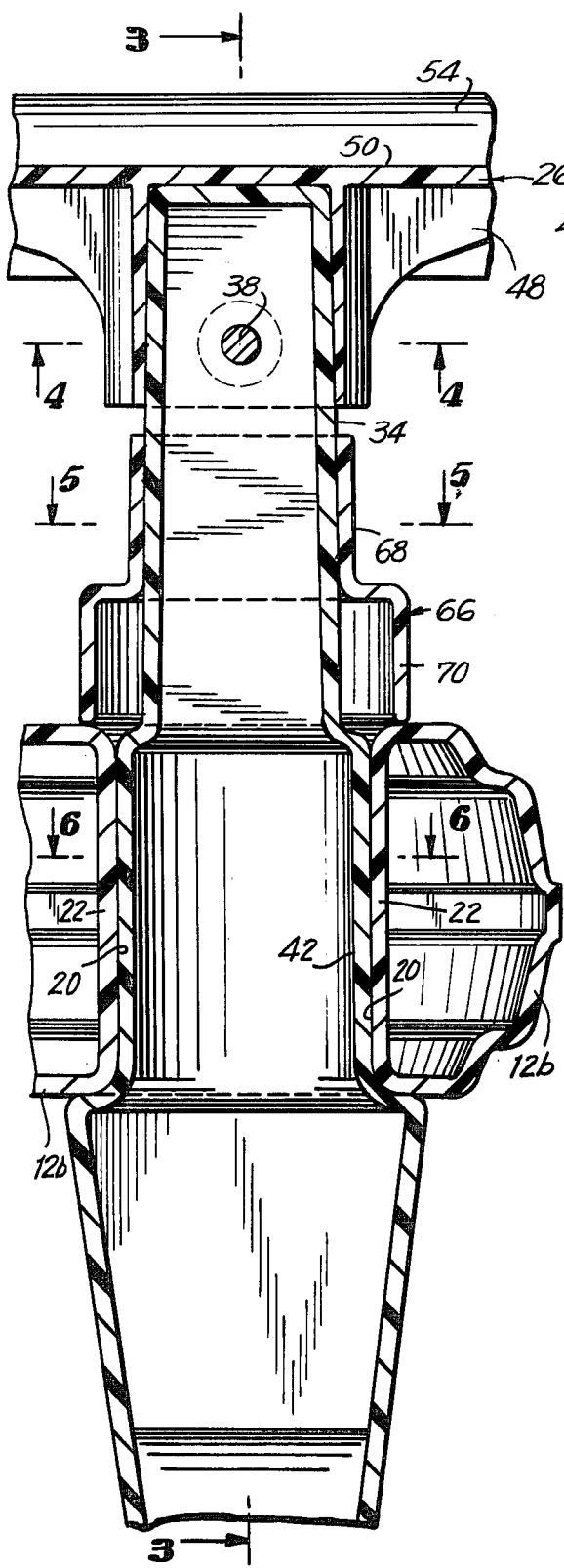
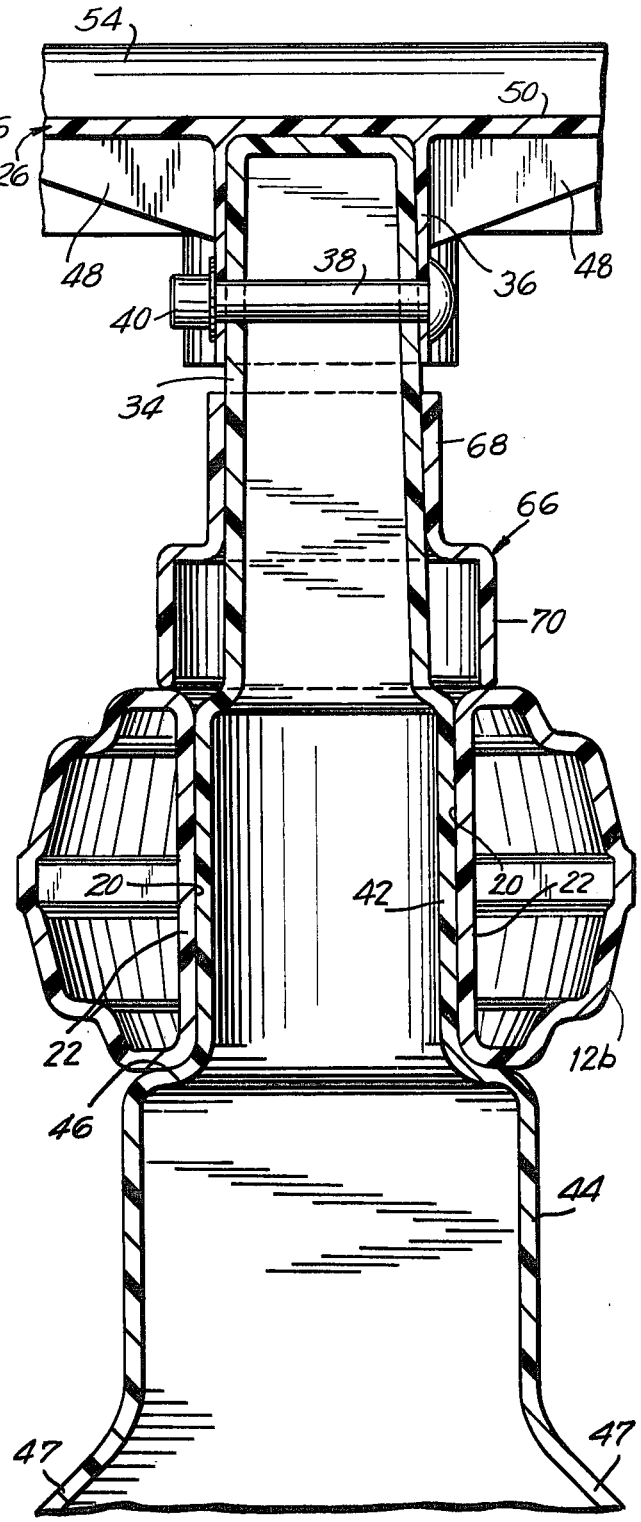

TOY VEHICLE CONSTRUCTION

BACKGROUND OF THE INVENTION

This invention relates generally to a toy vehicle and to the constuction thereof. Toy vehicles are generally of limited play value, serving only for riding. Especially where young children are involved, it would be desirable to enhance the play value of the vehicle by permitting other uses thereof, especially where intended for young children. It is also desirable to provide a vehicle which can be relatively inexpensively fabricated of light weight materials such as plastic and can be readily assembled by the consumer when shipped in a semi-knocked-down condition.

SUMMARY OF THE INVENTION

Generally speaking, in accordance with the invention, a vehicle body forming the seat of the vehicle is provided with a pair of rear, free-wheeling, ground engaging wheels. A front wheel assembly carrying ground engaging front wheel means is pivotably mounted on the body to effect steering of the vehicle through movement of the entire front wheel assembly. A flat playing surface is mounted to the pivotably mounted front wheel assembly. The playing surface also functions as the steering wheel for the vehicle, the user grasping the periphery of the playing surface to effect steering. The vehicle has a rear storage compartment. The front surface of the storage compartment also serves as a seat back.

Accordingly, it is an object of this invention to provide a toy vehicle of improved construction.

Another object of this invention is to provide a toy vehicle having a flat playing surface, with the flat playing surface also functioning as the steering mechanism of the vehicle.

A further object of the invention is to provide an improved toy vehicle having a storage compartment.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a fragmentary sectional view, at an enlarged scale, taken along the lines 2—2 of FIG. 1 and showing the steering arrangement of the toy vehicle;

FIG. 3 is a partial sectional view taken along lines 3—3 of FIG. 2;

FIG. 4 is a partial sectional view taken along lines 4—4 of FIG. 2;

FIG. 5 is a partial sectional view taken along lines 5—5 of FIG. 2; and

FIG. 6 is a partial sectional view taken along lines 6—6 of FIG. 2.

DESCRIPTION OF THE PREFERRED EMBODIMENTS

Figure 1:
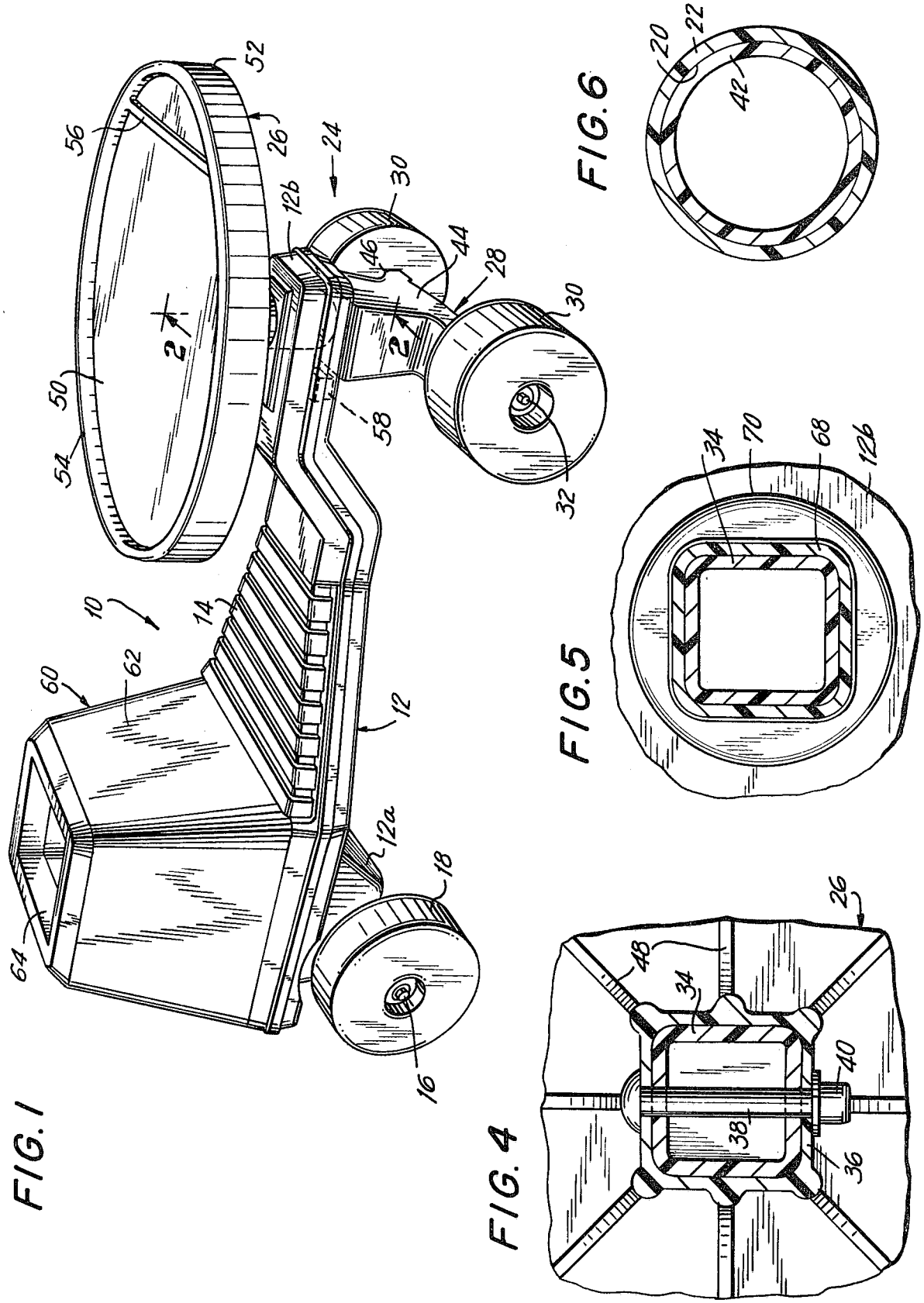
FIG. 1 is a perspective view of a toy vehicle constructed in accordance with a preferred embodiment of this invention.

A toy vehicle 10 has a body 12 preferably formed entirely of plastic material with the body preferably being of hollow molded construction. The upper surface of body 12 is formed to define a seat portion 14 on which a child will sit while riding on the vehicle. A through-axle 16 is journaled through the lower end rear portion 12a of body 12 thereof and rear ground engaging wheels 18 are mounted for free rotation on the ends of axle 16. Only one rear wheel 18 is shown in FIG. 1 but it will be understood that a second rear wheel 18 is carried by axle 16 on the opposite side of body 12.

Body 12 is provided with a relatively narrow front portion 12b formed with a substantially vertically extending cylindrical bore 20 therethrough as more particularly shown in FIGS. 2, 3 and 6. Bore 20 is defined by a cylindrical sleeve 22 formed integral with body 12 and which serves as a bearing for a steering mechanism as more particularly described below.

The steering mechanism is incorporated in a front wheel assembly 24 including a steering wheel table top 26, an integrally formed steering column axle holder 28, a pair of front wheels 30 and a front axle 32. Steering column axle holder 28 is, in the embodiment depicted, an integral plastic molded part defining a fairly complex shape. The top-most portion 34 is provided with a substantially square cross-section for mating with a correspondingly square-cross-sectioned socket 36 formed integrally with and depending from steering wheel table top 26. Steering wheel table top 26 is fixedly joined to upper portion 34 of steering column axle holder 28 by means of bolt 38 which is held in place by a lock cap 40. In this manner, rotative motion imparted to steering wheel table top 26 is transmitted to steering column axle holder 28 to effect steering.

Steering column axle holder 28 is provided with a central portion 42 of cylindrical cross-section dimensioned to be received within sleeve 22 of body 12 to provide a bearing relationship therebetween, the dimensions of central portion 42 of steering column axle holder 28 being selected so as to substantially avoid lateral wobbling of the steering column axle holder relative to the body while permitting pivotable relative rotation. In the embodiment depicted, central portion 42 of steering column axle holder 28 is of a larger lateral dimension than upper portion 34 to permit the insertion of the upper portion through bore 20 during assembly of the toy vehicle.

Lower portion 44 of steering column axle holder 28 is of increased cross-section relative to central portion 42. The step transition between central portion 42 and lower portion 44 defines a ledge 46 which serves to support body 12 in spaced relation to the ground as more particularly illustrated in FIGS. 1, 2 and 3. Ledge 46 also serves as a bearing surface. The lower end of lower portion 44 is provided with laterally extending projecting regions 47 which serve to support rear axle 32, which in turn rotatable supports a pair of rear wheels 30 in spaced relation on opposed ends of said rear axle. Assembly 24 rotates about a vertical axis passing through steering column axle holder 28 as a unit to effect steering. Steering is effected by the user, usually a young child, grasping the periphery of steering wheel table top 26 which is essentially circular, in the embodiment depicted. The steering wheel table top 26 is provided with a plurality of radially extending ribs 48 as more particularly shown in FIGS. 2, 3 and 4 which serve to provide structural rigidity to the essentially flat playing surface 50 and to join socket 36 to the peripheral wall 52 of said steering wheel table top. Peripheral wall 52 defines an upwardly projecting peripheral rim 54 enclosing playing surface 50. Playing surface 50 is divided into two portions by a rib 56 formed in the surface thereof.

As a safety feature, in order to limit the rotation of the assembly 24, a stopper member 58 (FIG. 1) projects from the under-surface of front portion 12b of body 12. Stopper member 58 is positioned so as to be engaged by lower portion 44 to limit the rotation of assembly 24.

Mounted above the rear section of body 12 is a storage box member 60 substantially shaped as a truncated pyramid. The front surface 62 of storage box 60 serves as a back for seat 14. Storage box 60 is hollow and has an entrance opening 64 in the top thereof. Storage box 60 adds to the play value of the toy vehicle by providing a box for storage and transport of other play things such as blocks.

As another safety feature, a collar 66 is mounted on upper portion 34 of steering column axle holder 28. Collar 66 has an upper portion 68 of square cross-section for mating with said upper portion 34 and a lower portion 70 of circular cross-section abutting the top surface of body 12 surrounding bore 20. Collar 66 prevents a child's fingers from getting caught in the bearing.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A toy vehicle construction comprising a body defining a seat for said vehicle, a pair of rear wheels mounted on a rear portion of said body; front wheel means; steering assembly means for supporting said front wheel means and for pivotable mounting to a forward region of said body so that said body is supported on said rear wheels and said front wheel means, said steering assembly means including a steering member for rotating said steering assembly means and front wheel means as a unit to effect steering, said steering member further including an essentially flat horizontal wall defining a playing surface, and a peripheral wall surrounding said playing surface and defining a shallow rim projecting upwardly from said playing surface, said peripheral wall also projecting downwardly from said playing surface for grasping by the rider, said horizontal wall substantially bridging said rim.

2. The toy vehicle as recited in claim 1, wherein said steering assembly means includes a steering column axle holder means having an upper portion fixedly joined to said steering member, a lower portion rotatably supporting said front wheel means and a central cylindrical portion, said body being formed in the forward region thereof with a cylindrical bore therethrough for receiving and rotatably supporting said central portion of said steering column axle holder means, said steering column axle holder means being provided with a ledge portion intermediate said central portion and said lower portion for supporting said body in spaced relation from the ground.

3. The toy vehicle as received in claim 3, including stop means mounted on said body adjacent the axial bore therein and positioned for selective engagement by said steering column axle holder means to limit the rotation thereof.

4. The toy vehicle as recited in claim 2 further including a safety collar mounted to said upper portion of said steering assembly means, said safety collar including a portion offset from said upper portion of said steering assembly means, said offset portion having a diameter greater than that of said cylindrical bore, said offset portion abutting the top surface of said forward region of said body to prevent the rider's finger from being injured by insertion between said central cylindrical portion of said steering assembly means and said cylindrical bore in said body portion.

5. The toy vehicle construction as recited in claim 2, wherein said upper, lower and central portions of said steering assembly means comprise a unitary moldment.

6. The toy vehicle as recited in claim 1, wherein the periphery of said steering member substantially defines a closed curve.

7. The toy vehicle as recited in claim 1, wherein said body includes hollow storage box means projecting upwardly from said body at a point rearwardly of the seat region thereof and including an axis opening, said storage box means including a front wall defining the seat back.

8. The toy vehicle as recited in claim 7, wherein said entrance opening is in the upper portion of said storage box means.

9. The toy vehicle as recited in claim 1, wherein said front wheel means is a pair of front wheels spaced along their axis of rotation and rotatably supported on said steering assembly means.

10. The toy vehicle as recited in claim 1, wherein said steering member is joined to said steering assembly means by means of a socket mating with said steering assembly means, said socket extending downwardly from the underside of said flat horizontal wall and radial ribs extending from said socket along the underside of said flat wall, said radial ribs tapering from a highest point at said socket to a point flush with the lower surface of said flat wall.

11. The toy vehicle as recited in claim 1, further including a shallow wall extending between points along the inner surface of said shallow rim, said wall dividing said playing surface into first and second sections, and said first section of said wall and said rim forming thereby a trough for placement of objects therein.

12. The toy vehicle as recited in claim 1, wherein said horizontally extending wall and said peripheral forming said rim of said steering member comprise a unitary moldment.

* * * * *